(12) United States Patent
Karppinen

(10) Patent No.: US 10,132,438 B2
(45) Date of Patent: Nov. 20, 2018

(54) SHOCK ABSORBER FOR HYDRAULIC SYSTEM

(71) Applicant: DYNASET OY, Ylöjärvi (FI)

(72) Inventor: Reijo Karppinen, Ylöjärvi (FI)

(73) Assignee: DYNASET OY, Ylöjärvi (FI)

(*) Notice: Subject to any disclaimer, the term of this patent is extended or adjusted under 35 U.S.C. 154(b) by 0 days.

(21) Appl. No.: 15/123,884

(22) PCT Filed: Mar. 5, 2015

(86) PCT No.: PCT/FI2015/000008
§ 371 (c)(1),
(2) Date: Sep. 6, 2016

(87) PCT Pub. No.: WO2015/132451
PCT Pub. Date: Sep. 11, 2015

(65) Prior Publication Data
US 2017/0016566 A1  Jan. 19, 2017

(30) Foreign Application Priority Data
Mar. 5, 2014 (FI) ...................................... 20140062

(51) Int. Cl.
*F15D 1/02* (2006.01)
*F16L 55/027* (2006.01)
(Continued)

(52) U.S. Cl.
CPC ........ *F16L 55/02763* (2013.01); *F16F 9/348* (2013.01); *F16K 47/08* (2013.01);
(Continued)

(58) Field of Classification Search
CPC .. F16L 55/02763; F16L 55/0333; F16F 9/348
(Continued)

(56) References Cited

U.S. PATENT DOCUMENTS 3,256,960 A * 6/1966 Casimir .................. F16F 9/464
188/266.2
3,592,302 A * 7/1971 Allinquant .............. F16F 9/067
137/533.21
(Continued)

FOREIGN PATENT DOCUMENTS

EP       0321194 A2   6/1989
JP    2001-041271 A   2/2001
(Continued)

OTHER PUBLICATIONS

Sep. 10, 2014 Search Report issued in Finnish Patent Application No. 20140062.
(Continued)

*Primary Examiner* — James Hook
(74) *Attorney, Agent, or Firm* — Oliff PLC

(57) ABSTRACT

Shock absorber used for damping a control flow which is to be directed to the control valve belonging to a hydraulic system or is to be directed to the adjustable valve of the flow through which absorber the flow of the hydraulic fluid can be directed at least in one direction. The absorber is a stopper which restricts the run of the flow to be damped which stopper is equipped with one or several ducts which let the flow go through the mentioned stopper when the other orifice of the mentioned duct is blocked with a plate in such a way that bending of the mentioned plate opens access for the flow through the mentioned stopper due to the pressure of the flow coming along the mentioned duct.

7 Claims, 1 Drawing Sheet

(51) Int. Cl.
   *F16K 47/08* (2006.01)
   *F16L 55/033* (2006.01)
   *F16F 9/348* (2006.01)
   *F15B 13/02* (2006.01)

(52) U.S. Cl.
   CPC ......... *F16L 55/0333* (2013.01); *F15B 13/026* (2013.01); *F15B 2211/50572* (2013.01); *F15B 2211/5756* (2013.01); *F15B 2211/635* (2013.01)

(58) Field of Classification Search
   USPC .............................................. 138/31, 45, 46
   See application file for complete search history.

(56) References Cited

U.S. PATENT DOCUMENTS

| | | | | |
|---|---|---|---|---|
| 3,621,951 A | * | 11/1971 | Schmid | F16F 9/3415 137/468 |
| 3,957,140 A | * | 5/1976 | Overkott | F16F 9/3405 137/493.8 |
| 3,958,672 A | * | 5/1976 | Keilholz | F16F 9/52 188/277 |
| 4,024,889 A | * | 5/1977 | Smith | F16K 15/144 137/517 |
| 4,098,296 A | * | 7/1978 | Grasso | F16K 15/144 137/855 |
| 4,262,844 A | * | 4/1981 | Sekiya | G05D 23/10 138/45 |
| 4,653,617 A | * | 3/1987 | Casimir | F16F 9/464 137/906 |
| 4,972,929 A | * | 11/1990 | Ivers | F16F 9/3484 188/282.6 |
| 5,018,608 A | * | 5/1991 | Imaizumi | F16F 9/50 188/282.5 |
| 5,425,398 A | * | 6/1995 | Moradmand | F16F 9/3485 137/854 |
| 5,584,226 A | | 12/1996 | Roemer et al. | |
| 5,797,430 A | * | 8/1998 | Becke | F04B 11/0016 138/26 |
| 6,202,805 B1 | | 3/2001 | Okada et al. | |
| 6,655,512 B2 | * | 12/2003 | Moradmand | F16F 9/348 188/282.5 |
| 2003/0150679 A1 | | 8/2003 | Feist et al. | |

FOREIGN PATENT DOCUMENTS

| | | |
|---|---|---|
| JP | 3 471438 B2 | 12/2003 |
| JP | 2009-063079 A | 3/2009 |
| WO | 93/19313 | 9/1993 |
| WO | 2005/015384 A1 | 2/2005 |

OTHER PUBLICATIONS

Jun. 15, 2015 International Search Report issued in International Patent Application No. PCT/FI2015/000008.
Jun. 21, 2017 Search Report issued in Chinese Patent Application No. 201580012045.3.
Oct. 30, 2017 Supplementary Search Report issued in European Patent Application No. 15758760.

\* cited by examiner

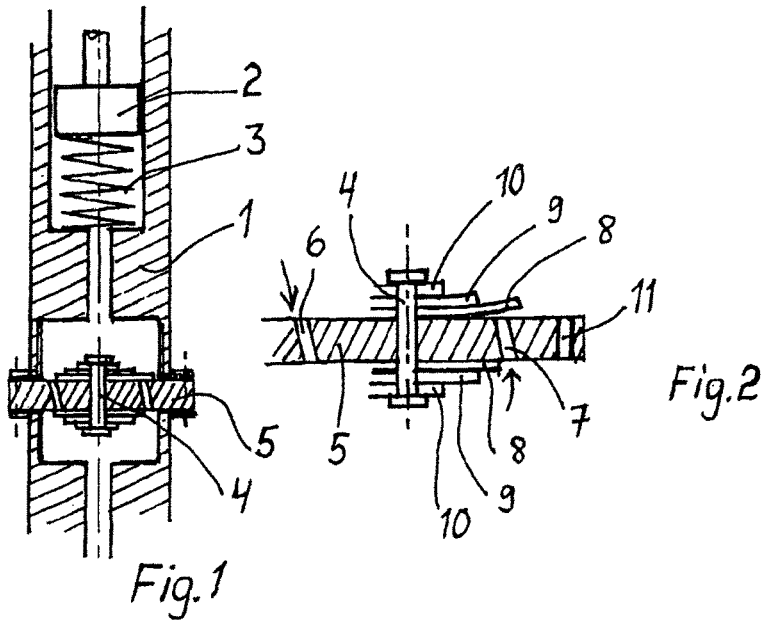
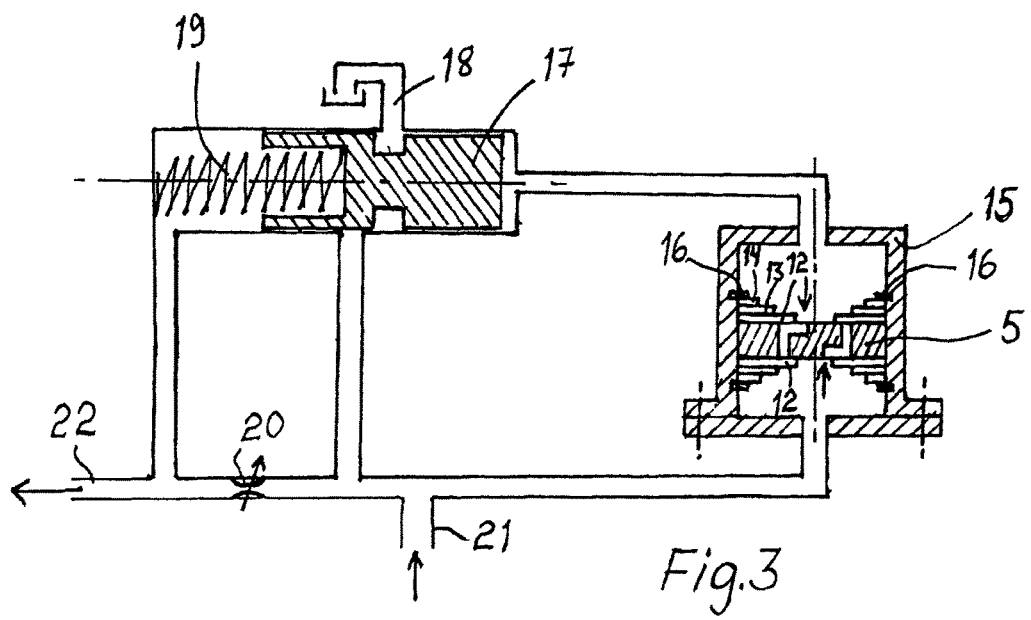

SHOCK ABSORBER FOR HYDRAULIC SYSTEM

Invention relates to a shock absorber used for damping a control flow which is to be directed to a control valve belonging to a hydraulic system or to the adjustable valve of the flow through which damper the flow of the pressurized, controlling hydraulic fluid can be directed at least in one direction.

For example choke—check valve dampers are previously known as dampers of control flows and one must have two different pieces of them in parallel in line if one wants to have a different kind of damping in one direction than what the other direction has. Chokers that are located in these can also be adjustable but still they don't always react in a positive way to vibrations that occur in the fluid line that is directed to the control valve and their adjustments don't always stay in the set value and are not always accurate.

Further dampers are known from publications US 2003/150679 and WO 2005015384 which damp the movement of masses. In these solutions a movable piston is adjusted to a cylinder which is filled with hydraulic fluid which piston is connected outside the cylinder with the help of a piston rod. The movement of the piston is damped in the cylinder by letting the hydraulic fluid go in a restricted way over the piston at least in one direction. The other direction can be unrestricted. The run of the hydraulic fluid over the piston can be restricted with the help of a valve which opens due to pressure difference and which is formed of bendable plates. In these solutions the main flow of pressurized fluid running in the cylinder from one side of the piston to the other side is restricted with the help of a valve in which case the formed system functions as a restrictor/damper of movement speed.

In order to remove these disadvantages a new absorber has been developed with the help of which one can achieve an essential improvement to the known prior art when one deals with the control of the control pressure which is directed to the pressure controlled valves and when one deals with the damping of vibration. It is characteristic of the shock absorber according to the invention that the shock absorber is a stopper which restricts the run of the control flow to be damped which absorber is equipped with one or several ducts which let the flow go through the mentioned stopper when the other orifice of the mentioned duct is being blocked with a plate in such a way that the bending of the mentioned plate due to the pressure of the flow coming along the mentioned duct opens access for the flow through the mentioned stopper.

The significant advantage of the absorber according to the invention is the fact that damping can be achieved for the hydraulic fluid which runs to the controlling valve in both flowing directions and as different volumes, if needed. The absorber can easily be adjusted regarding its properties according to the need of the speed and vibration control of the need for control of all kinds of valves separately in both directions. The absorber can be located in the stem of the valve to be controlled, it can be a separate part in the valve or be its independent component in a pipework that directs the control pressure.

In the following the invention is described more detailed by referring to the accompanying drawing in which FIG. 1 shows a shock absorber according to the invention being located before the stem of the control valve.

FIG. 2 shows a part of an absorber as an enlarged figure.

FIG. 3 shows an absorber in connection with a pressure compensated flow controller.

In the FIG. 1 the stem 2 of the control valve located inside the body 1 and the spring 3 are shown. The pressure line of the controlling hydraulic fluid runs through the damper arrangement 4, 5 according to the invention to the stem 2. The damper arrangement comprises a stopper 5 which stopper is assembled to prevent the control flow from running to the stem 2 or away from there. According to the FIG. 2 the stopper 5 comprises ducts 6 and 7 along which the pressure flow could run through the stopper if the ducts 6 and 7 were not closed with plates 8-10, in other words with shimming plates. The plates 8 that are against the stopper 5 have the largest outer diameter in such a way that when they are in an direct position, they cover the other orifices of the ducts 6 and 7. The other plates 9, 10 have a smaller outer diameter. In the FIG. 1 the absorber is in a free state in which case pressure difference does not have an effect over the absorber.

In the FIG. 2 pressure difference for its part has an effect over the absorber to such an extent that at least the undermost plate 8 is bent and lets the hydraulic fluid flow through the stopper 5 along the duct 7. The diminishing of the pressure difference closes the duct 7 and then the plate 8 is restored back to its direct form. The stopper 5 is attached to the flange of the body 1, which can be divided, through bolt holes 11 that are located in the stopper in which case the absorber can be revealed and its plates 8-10 can be changed for example in order to change the adjustment properties. With the plates 9 and 10 the bending capacity of the undermost plate 8 can be affected. The plates 8-10 are stacked and tied so that they rest on the middle bolt 4. The middle bolt 4 can be opened at the other end for example with the help of a nut that can be unscrewed. The absorber damps the vibration occurring in the control flow most effectively in the state of the FIG. 2 in which case the plate 8 is in a sensitive state due to the pressure difference opening and closing the duct 7 when the pressure difference changes.

In the FIG. 3 a pressure compensated flow controller is shown schematically. The main flow comes in at the point 21 and comes out at the point 22. The position of the valve stem 17 and its movements adjust the amount of the flow being removed through an aggregate 18. When the pressure increases the outgoing flow becomes bigger when the stem 17 moves against the spring 19. The absorber 5, 12-14 is located at the body 15 with the help of retaining rings 16. The pressure controlling the stem 17 goes through the absorber and a sufficient pressure difference opens the duct through the stopper 5. The undermost plate 12 bends most at its inner edge due to the pressure and the flow then has an access to the stem 17 along the right hand duct. The body 15 is also divided with a flange joint in which case the absorber arrangement can be disassembled and re-assembled.

In this way of executing the plates 12-14 are plate rings which have an equally sized outer diameter in which case only their inner diameter varies. The undermost plate 12 covers at least the orifice of the other duct. The absorber damps the movements of the stem 17 and prevents vibrations from occuring. The left hand duct that is located in the stopper 5 lets the flow run back from the stem 17 if the pressure difference over the absorber is sufficient.

The plates 8-10 and 12-14 are most advantageously round spring steel rings the thickness of which rings is less than 20% of the outer diameter. The shape of their outer edge can also deviate from the round form, for example it can be an angular shape, most advantageously then when they are tied with the help of the perch bolt 5 according to the FIGS. 1 and 2.

There can be different plate arrangements above and below the stopper 5 if one wants to have different damping properties in different flowing directions.

The invention claimed is:

1. A shock absorber used for damping a control flow which is to be directed to the control valve belonging to a hydraulic system or is to be directed to the adjustable valve of the flow through which shock absorber the flow of the pressurized, controlling hydraulic fluid can be directed at least in one direction, the shock absorber comprising:
   a stopper which restricts the run of the control flow to be damped;
   one or several ducts which let the flow run through the stopper when an orifice of the duct is blocked with a plate in such a way that bending of the plate opens access for the control flow through the stopper due to the pressure of the flow coming along the duct, wherein several plates are stacked on top of each other in which case the plate that is located against the stopper has the smallest inner diameter.

2. The shock absorber according to the claim 1, wherein the plate is a round ring the thickness of which ring is less than 20% of its outer diameter.

3. The shock absorber according to the claim 1, wherein the several plates are stacked on top of each other in which case the plate that is located against the stopper has the largest outer diameter.

4. The shock absorber according to the claim 1, wherein the bending of an outer edge of the plate opens the flow path for the hydraulic fluid.

5. The shock absorber according to the claim 1, wherein the bending of an inner edge of the plate opens the flow path for the hydraulic fluid.

6. The shock absorber according to the claim 1, wherein the shape of an outer edge of the plate deviates from the round shape.

7. A hydraulic system comprising a main flow, a pilot flow and a shock absorber damping the pilot flow which is to be directed to a control valve belonging to a hydraulic system or is to be directed to an adjustable valve, of the flow through which the flow of the shock absorber is pressurized and controlling hydraulic fluid can be directed at least in one direction, wherein the shock absorber is a stopper which restricts the run of the pilot flow to be damped which shock absorber is equipped with one or several ducts which let the flow run through the stopper when an orifice of the duct is blocked with a plate in such a way that bending of the plate opens access for the pilot flow through the stopper due to the pressure of the flow coming along the duct.

* * * * *